United States Patent
Coleman et al.

(10) Patent No.: US 6,253,976 B1
(45) Date of Patent: Jul. 3, 2001

(54) ROTATABLE TOOLBOX SYSTEM USEFUL ON MOTORIZED VEHICLES

(76) Inventors: Charles R. Coleman, 2601 Valencie, Bellingham, WA (US) 98226; Robert J. Coleman, 1625 Mapleton, Dallas, TX (US) 75228

( * ) Notice: Subject to any disclaimer, the term of this patent is extended or adjusted under 35 U.S.C. 154(b) by 0 days.

(21) Appl. No.: 09/452,859

(22) Filed: Dec. 3, 1999

Related U.S. Application Data

(63) Continuation-in-part of application No. 09/124,622, filed on Jul. 29, 1998, now Pat. No. 6,006,971.

(51) Int. Cl.[7] ........................................................ B60R 9/00
(52) U.S. Cl. ........................ 224/404; 224/310; 224/281; 224/282; 296/37.6; 414/498; 414/537; 359/841; 359/844; 280/748
(58) Field of Search ........................................ 224/404, 310, 224/281, 282; 414/498, 537; 280/748, 749; 296/37.6, 24.1; 359/841, 844

(56) References Cited

U.S. PATENT DOCUMENTS

| | | |
|---|---|---|
| D. 345,650 | 4/1994 | Boyd . |
| D. 374,654 | 10/1996 | Steketee . |
| D. 430,426 * | 9/2000 | Bieker et al. ........................ D6/445 |
| 3,757,972 | 9/1973 | Martin . |
| 3,826,529 | 7/1974 | Wood . |
| 4,249,684 | 2/1981 | Miller et al. . |
| 4,350,257 | 9/1982 | Groth et al. . |
| 4,522,326 | 6/1985 | Tuohy, III . |
| 4,531,774 * | 7/1985 | Whatley ............................. 296/37.6 |
| 4,844,305 * | 7/1989 | McKneely ......................... 224/42.24 |
| 4,967,944 | 11/1990 | Waters . |
| 5,052,737 | 10/1991 | Farmer, Jr. . |
| 5,121,959 | 6/1992 | King . |
| 5,224,531 | 7/1993 | Blohm . |
| 5,368,357 | 11/1994 | Kalis, Jr. et al. . |
| 5,382,069 | 1/1995 | Chambers . |
| 5,398,987 | 3/1995 | Sturgis . |
| 5,419,476 | 5/1995 | White . |
| 5,497,878 * | 3/1996 | Sandonato ............................ 206/372 |
| 5,518,158 | 5/1996 | Matlack . |
| 5,622,299 | 4/1997 | Berard . |
| 5,634,577 | 6/1997 | Pearson, Jr. et al. . |
| 5,988,473 * | 11/1999 | Hagan et al. ......................... 224/404 |
| 5,996,868 * | 12/1999 | Paradis ................................. 224/404 |
| 6,068,319 * | 5/2000 | O'Brien .............................. 296/37.6 |
| 6,126,131 * | 10/2000 | Tietz ............................... 248/346.01 |

* cited by examiner

*Primary Examiner*—Stephen K. Cronin
(74) *Attorney, Agent, or Firm*—Christopher J. Whewell

(57) ABSTRACT

Provided herein is a toolbox system especially well suited for use on pickup trucks. The system provides quick and easy access to a wide variety of tools which may be contained in the toolboxes. The assemblies may be modular and are readily loaded and unloaded from the bed portion of a pickup truck. An increased degree of safety and convenience is realized from use of the devices herein set forth.

20 Claims, 9 Drawing Sheets

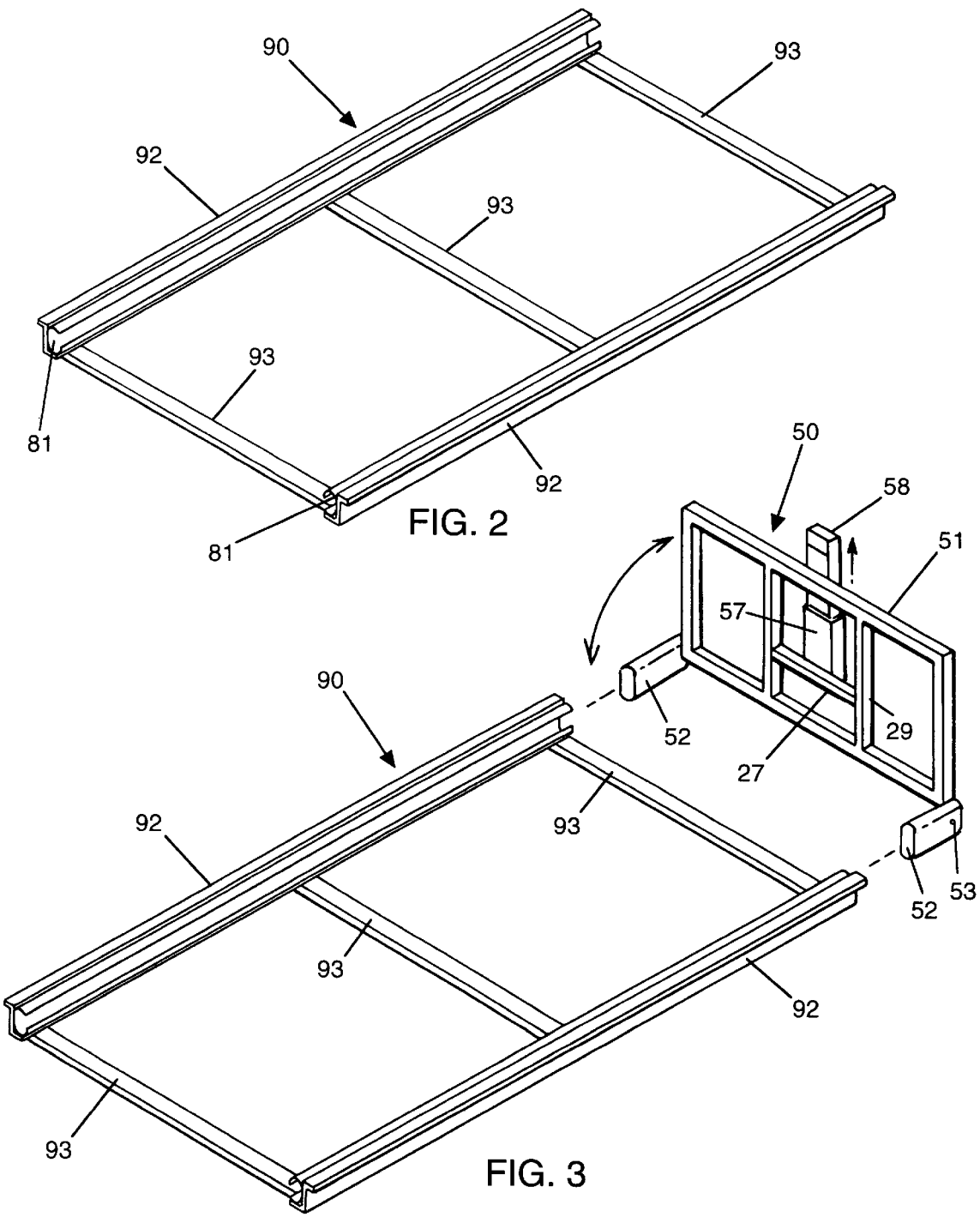

ROTATABLE TOOLBOX SYSTEM USEFUL ON MOTORIZED VEHICLES

CROSS REFERENCES TO RELATED APPLICATIONS

This application is a Continuation-In-Part of U.S. patent application Ser. No. 09/124,622 which was filed on Jul. 29, 1998 now U.S. Pat. No. 6,006,971 and is currently still pending, the entire contents of which are herein incorporated by reference thereto.

BACKGROUND INFORMATION

1) Technical Field

This invention relates to a toolbox system especially adapted for use by workpersons employing pickup trucks and the like for performance of various trades and/or workings. The toolbox systems disclosed herein are designed to be housed in the bed portion of a typical pickup truck.

2) Description of Related Art

Pickup trucks have been attractive as work vehicles since their initial appearance in the marketplace. Many workpersons have found them especially convenient for assisting in caddying tools, implements, and the like for the various trades in which they are employed, including plumbers, painters, electricians, mechanics, etc. Tradespersons engaged in these and other professions have found it desirable to have tool boxes mounted in the truck bed area, behind the operator's cab. Generally, the tool boxes are intended to organize and restrain tools and other items that would otherwise be free to move about the truck's bed area.

The prior art provides a wide variety of toolboxes adaptable for use in the bed of a pickup truck. For example, U.S. Pat. No. 5,634,577 describes an open bottom crossover toolbox insert; U.S. Pat. No. 5,419,476 discloses a truck toolbox locking door plate; U.S. Pat. No. 5,398,987 describes a toolbox assembly for use in the bed of a pickup truck; U.S. Pat. No. D345,650 discloses an automotive toolbox; U.S. Pat. No. D374,654 sets forth a truck mounted toolbox; U.S. Pat. No. 5,518,158 teaches a pickup truck tailgate toolbox assembly; U.S. Pat. No. 5,382,069 sets forth a hideaway door for truck beds in which tools may be housed; U.S. Pat. No. 5,368,357 describes a utility truck body having option attachment components for attaching toolboxes or the like; U.S. Pat. No. 5,224,531 describes a portable tool caddying device which is readily maneuvered into the bed of a pickup truck; U.S. Pat. No. 5,121,959 describes a slide mount for pickup truck tool boxes; U.S. Pat. No. 5,052,737 describes an attachment for securing a toolbox to a pickup truck; U.S. Pat. No. 4,967,944 describes a truck tool box of unitary construction; U.S. Pat. No. 4,350,257 sets forth a kit for assembling a toolbox adapted for installation in the back of a pickup truck; and U.S. Pat. No. 4,249,684 sets forth a removable toolbox adapted for use in a pickup truck bed, to name but a few.

By far the most popular type of toolbox which is commonly seen located within the bed of a pickup truck is the crossover toll box. The crossover toolbox is so named because of its physical orientation with respect to the rectangular truck bed. The crossover toolbox is normally oriented across the bed of a pickup truck, from one side to the other. Frequently the crossover tool box is located directly behind the rear window of the operator's cab, and the toolbox normally has one or more lids transversely hinged with respect to the longitudinal length of the box. In the case of a single box lid, its length will extend across the truck bed and be hinged at one end adjacent to the side of the bed. In such configuration, the entire lid must be raised to access the tools inside the box. In the case where a plurality of lids are employed, for example, two lids, each is normally hinged in a back-to-back configuration, one to the other at the middle of the box. In this configuration, the lid has a length that is equal to one-half or less of the width of the truck bed, and permits the user to lift the lids independently from the sides of the truck.

It is a necessary requirement of truck mounted tool boxes in general to restrain work implements and other items from free motion caused by inertial forces normally present under conditions encountered by moving motor vehicles, while at the same time containing a provision for convenient access by the workpersons desiring to employ the tools at a given time. The toolbox must also, in general, have a reasonable capacity for holding tools, be durable, and possess a reasonable degree of eye appeal, i.e., they should be aesthetically pleasing.

One problem associated with truck tool boxes of the prior art is gaining access to a specific item within the tool box without having to remove other various and sundry items that may be either on top of the desired item or obscuring it from view. One attempt at resolving this problem is the provision of sliding drawers that are used to compartmentalize the interior of the toolbox, examples of solutions being disclosed in U.S. Pat. Nos. 4,789,195 and 4,844,305. However, many pickup truck tool boxes of prior art are non-compartmentalized, and access to specific items contained therein may not easily be made without removal of various items in order to provide access to the desired item.

It is common for a pickup truck to be parked in the street, at the curb position while workpersons undertake a task at hand. For the workman desiring to extract a tool which is located in such a position to only be accessible to one standing along the side of the pickup truck which is near moving traffic, the worker must expose themselves to the dangers inherently present to being in close proximity with moving vehicles. Therefore, an additional problem associated with prior art toolboxes intended for mounting in the beds of pickup trucks is the lack of safety provisions for workpersons desirous of accessing the various implements contained in the toolbox from the street. This is especially true when the implement to be removed from the truck is large, bulky, or awkward, since the worker must in general lift the item to an elevated level, which in turn requires cautious leveraging if one is to maintain control over one's person, as well as balance. Compounding the hazard is the potential for injury to the spine from such required awkward leveraging.

Clearly then, a toolbox adaptable for use in the bed of a pickup truck which is capable of permitting rapid and convenient access to a large number of tools while minimizing safety hazards to its users is highly desirable. It is therefore an object of this invention to provide a tool caddying device for use in the bed of a pickup truck which is capable of containing a large number of tools, which tools are easily accessible by a workman regardless of the position of the workman with respect to the pickup truck when the pickup truck is in a parked position. It is a further object of this invention to provide a frame adapted for use in the bed of a pickup truck which is capable of accepting a plurality of different toolbox modules which may be readily inserted into said frame and conveniently accessed by a workman at an appropriate time. These and other objects will become apparent to one of ordinary skill in this art after thoroughly reading and understanding this specification and the claims appended hereto.

SUMMARY OF THE INVENTION

The present invention provides a new and improved method of accessing tools by workmen who choose to use the pickup truck as the means of transportation and containment of the implements they use on a regular basis. However, the system of this invention is readily adapted to other conveyances in addition to pickup trucks.

Generally speaking, the present invention comprises a toolbox system adapted to reside atop or in a motor vehicle. The toolbox is ergonomically designed, and is rotatable about a central vertical axis so as to provide quick and convenient access by a person in a stationary position to all of the compartments contained within the toolbox. The toolbox is compartmentalized, and each compartment may be conveniently and readily removed by the user. Additionally, the toolbox as a whole may be easily removed from the pickup truck or other conveyance on or in which it is transported. Such provision permits rapid exchange of the entire contents of the rotating toolbox, which is desirable in a variety of trades.

BRIEF DESCRIPTION OF THE DRAWINGS

FIG. 2 is a perspective view of a means for attaching the rotatable mounting means to the bed portion of a motorized vehicle according to a preferred form of the invention;

FIG. 3 is a perspective view of a means for attaching the rotatable mounting means to the bed portion of a motorized vehicle according to a preferred form of the invention, and further comprising a swing-up cab-guard in the "up" position;

DETAILED DESCRIPTION OF PREFERRED EMBODIMENTS

Figure 1:
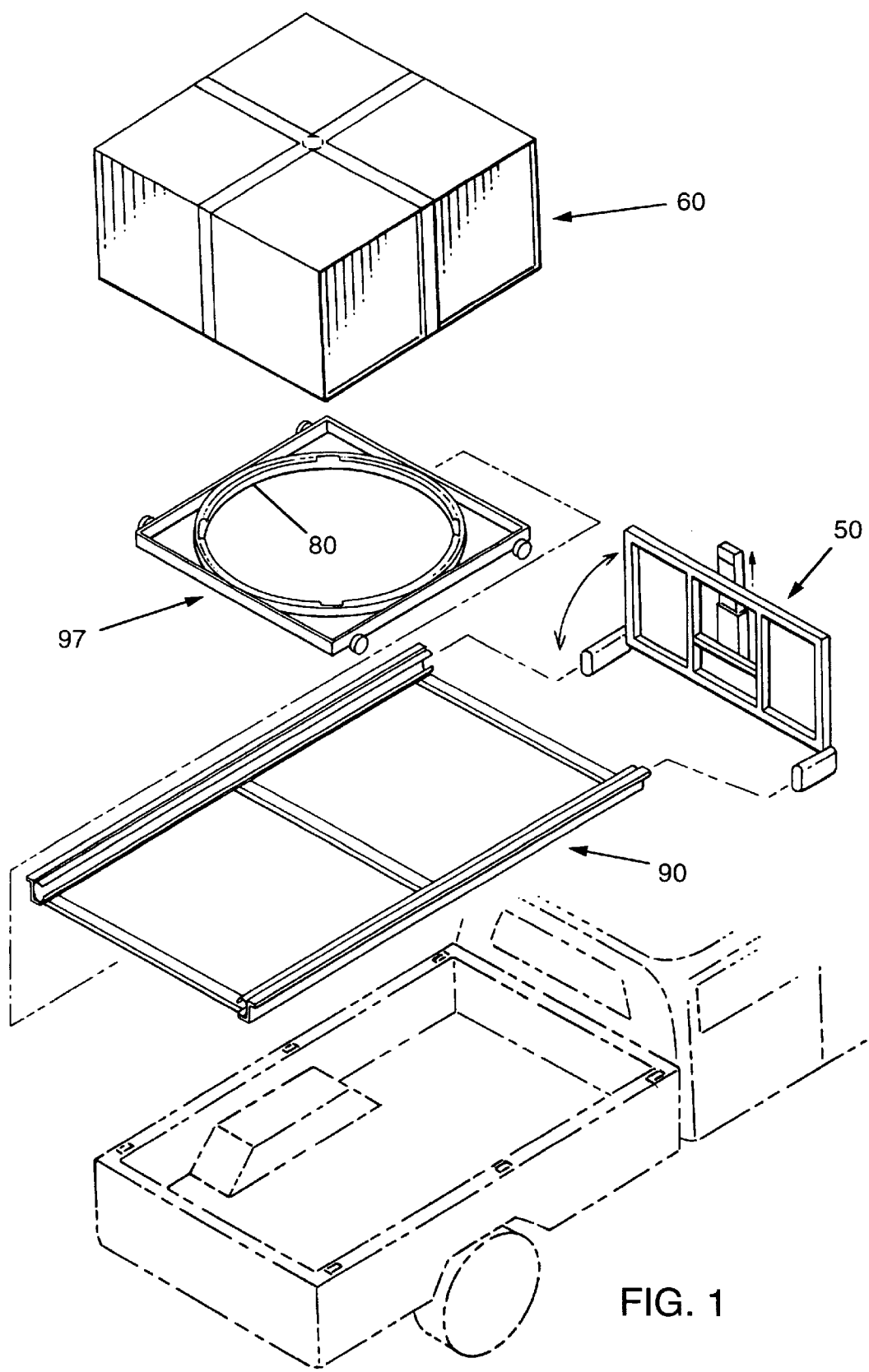
FIG. 1 is an exploded perspective view of components according to a preferred form of the invention.

Referring to the drawings and initially to FIG. 1 there is illustrated a tool-caddying device in accordance with the principles of the present invention. Therein are depicted a means for attaching a rotatable mounting means to the bed portion of a pickup truck, which in this preferred instance is truck-bed liner C-frame assembly 90, a preferred swing-up cab-guard assembly 50, a first portion of a rotatable mounting means, which is wheeled rotational round C-track assembly 97, and a second portion of the rotatable mounting means, which is a rotating modular container assembly 60 that has roller portions on its underside that are adapted to cooperatively function with the C-track assembly, as will be shown later. All of these elements are shown in relation to a pickup truck upon which they are intended to be mounted. In general terms, the cab-guard assembly is attached to the means for attaching the rotatable mounting means to the bed portion of the pickup truck, which is C-frame 90, and the combination of these elements is securely fastened to the topmost surface of the bed of a pickup truck in the orientation shown. In a preferred form of the invention, a C-track assembly 97 is mounted within C-frame 90 by virtue of casters or rolling wheels at the outer edges of C-track assembly 97 being inserted into the grooves of C-frame 90. Finally, container assembly 60, which preferably comprises one or more toolboxes or the like for caddying tools, hardware, or the like, is rotatably attached to C-track assembly 80 to provide a rotatable toolbox system mounted to the pickup truck. Using such an arrangement, it is possible to provide a toolbox system for adaptation to a pickup truck wherein the toolbox is both rotatable to permit easy access by a stationary workman irrespective of his position about the bed of the pickup truck, and removal and substitution of the toolbox as a whole.

It is most preferred that the rotatable mounting means be readily attachable or removable from the means for attaching it to the bed portion of the pickup truck. This is to facilitate easy exchange of different means for containing a plurality of tools from the truck. Although it is preferred in one form of the invention that the rotatable mounting means comprise a circular track portion as depicted by assembly 97 and a modular portion having rollers disposed on its underside to cooperatively function with the C-track portion to confer rotational motion capabilities to the modular portion (and hence any means for containing a plurality of tools contained therein), other equivalent means for permitting rotation of a means for containing a plurality of tools or a modular assembly which contains a means for containing a plurality of tools are herein indicated as being functional equivalents to the embodiments disclosed for purposes of this invention. The rotatable mounting means may comprise two substantially-planar surfaces arranged in an essentially parallel configuration to one another and connected to each other by a bearing means, as such bearing means and means for attaching planar pieces of sheet metal or other stock to one another to confer rotational motion capabilities to the planar pieces with respect to one another are well known to those skilled in the mechanical arts. Such bearing means may include, without limitation, wide inner ring ball bearings, rod end bearings and associated rods, cylindrical bearings, tapered bearings, spherical bearings, plain bearings, radial needle roller bearings, a "lazy Susan" arrangement, or may be a simple shaft common to each planar piece that is disposed within a hole through in each piece in a perpendicular orientation to each piece. Such other functional equivalents shall be referred to herein as a "rotatable mounting means". Generally, a rotatable mounting means has a first portion and a second portion, each portions of which are rotatable with respect to one another. In the case of a lazy Susan, there is a top (first) portion and a bottom (second) portion, each of which are rotably connected to one another by a bearing means. The bearing means may be removable, so as to provide a first portion of the rotatable mounting means that is detachable from the second portion of the rotatable mounting means. In general, the rotatable mounting means must have a provision for securing a means for containing a plurality of tools, wares, or the like on its top surface, which provision for securing may be any fastening means known to those skilled in the art, including without limitation screws, rivets, braces, brackets, straps, etc.

The rotatable mounting means must also have a provision that enables it to be attached to a motorized vehicle, and preferably to the bed portion of a pickup truck. Such provision may be any fastening means known to those skilled in the art, including without limitation screws, rivets, braces, brackets, straps, etc. For purposes of the invention it is especially preferred that the means for attaching the rotatable mounting means to the bed portion of the motorized vehicle includes a track portion adapted to cooperatively function with a complementary counterpart that is a part of the rotatable mounting means, to enable the rotatable mounting means to be readily secured to the means for attaching the rotatable mounting means to the bed portion of the motorized vehicle. The means for attaching the rotatable mounting means to the truck may include the tracks as shown in the figures herein, or may be of any other sliding track arrangement known to those skilled in the art, with the only proviso that the track portion and a complementary counterpart that is part of the rotatable mounting means may function cooperatively together towards the end of providing ready removal or installation of the means for containing a plurality of tools onto the truck.

Depicted in FIG. 2 is a means for attaching a rotatable mounting means to the motorized vehicle according to a preferred form of the invention, which is a truck bed liner C-frame assembly 90. This element comprises installation rails 92 and cross braces 93. The installation rails include round C-track portions 81 which are attached to installation rails 92. The round C-track portions are complementary to the size of the casters 86 which are a part of the support frame 84 (FIG. 6) to be inserted therein. Although this type of mating is the most preferred form of the instant invention, other functionally-equivalent means are contemplated as being useful for this purpose herein including various wheel or slot arrangements which are complementary to one another and similarly functionally slidable. The angle iron portions are preferably z-shaped in cross section to provide for easy mounting to the bed of a pickup truck to which the whole shall rest, and to provide a nesting position for the C-shaped installation rails to reside securely, although a myriad of other means shall become obvious to one of ordinary skill after reading this specification and the appended claims. Conventional fastening means (not shown) are employed to fasten the C-shaped rails to the angle iron portions and may include, but are not limited to screws, rivets, bolts, welds, and braces.

FIG. 3 depicts a more preferred embodiment of a means for attaching a rotatable mounting means to the bed portion of the motorized vehicle, which in this case is frame assembly 90 that comprises installation rails 92, cross braces 93, and a swing-up cab guard assembly 50 attached to the frame assembly. The presence of the cab guard is for safety purposes to shield the operator of the vehicle from the toolbox assembly in the unlikely event that the toolbox or any portion of it should become dislodged from its moorings and be caused to move suddenly toward the vehicle cab under the influence of inertial forces. The cab guard assembly consists of a frame portion 51, and insert portions 52 which are designed to fit inside the C-track portions 80. After being slid into the open ends of the C-track portion, the inserts are secured by conventional fastening means which may consist merely in a pin being inserted through common holes in each member, aligned with one another. The inserts may be attached to the end portion of an alternative means for attaching the rotatable mounting means to the bed portion of the motorized vehicle using conventional fastening techniques. Provided at the junction of the inserts 52 and the frame 51 on each side of the cab guard assembly are hinge pins 53 which provide for the rotation or swinging up of the cab guard assembly as indicated by the arrow in FIG. 3. Also included as part of the cab guard assembly is housing portion 57 which is machined in a complementary fashion to that of telescoping portion 58 to permit the free vertical motion of telescoping portion 58, as well as a spring, as is more fully described in FIG. 18. The guard assembly is preferably equipped with a periscope located in telescoping portion 58 and its housing 57 which provides for uninhibited rear-view mirror sight, and the periscope and its housing are each provided with a complementary means for permitting the locking in place of the periscope in position, such as, for example, matching holes in each capable of being aligned and locked in place simple insertion of a pin through their walls when the holes in each are in alignment.

Figure 4:
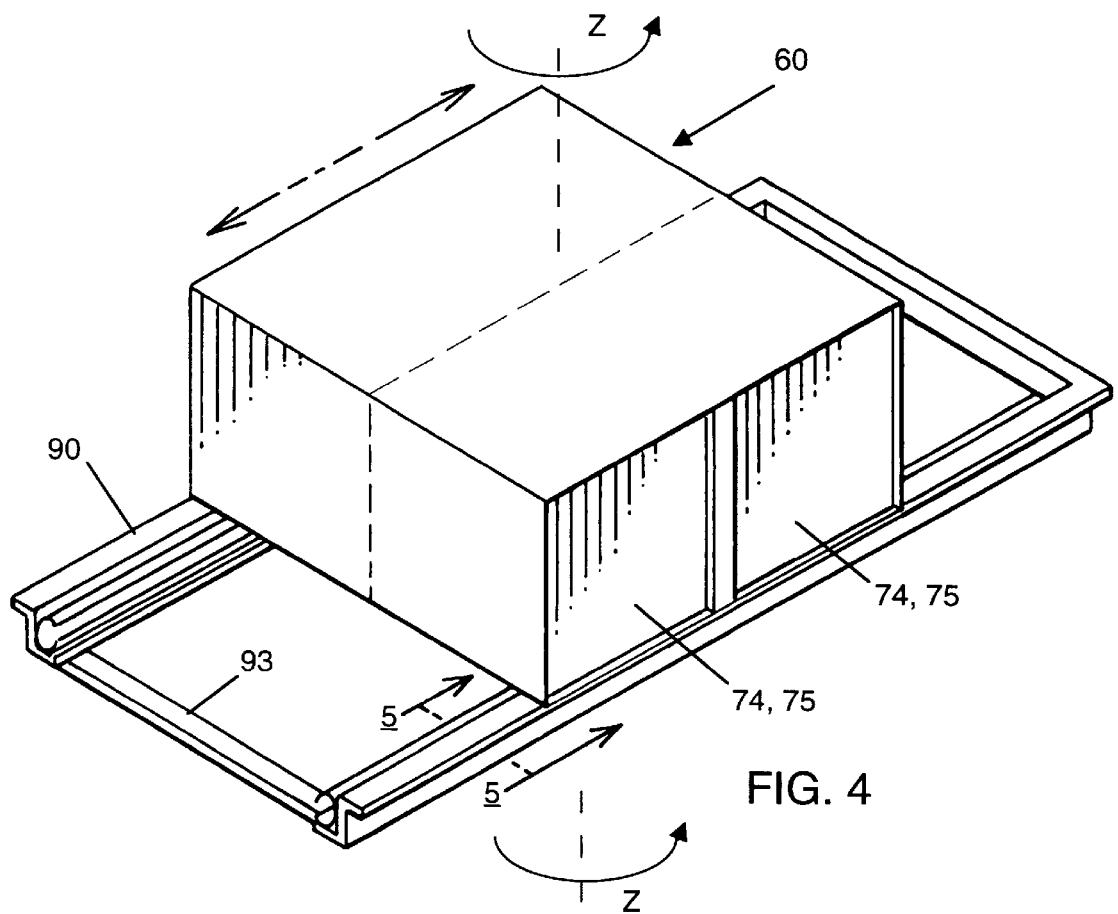
FIG. 4 is a perspective view of a means for attaching the rotatable mounting means to the bed portion of a motorized vehicle according to a preferred form of the invention, and showing a rotatable mounting means that contains a means for containing a plurality of tools rolled into the center position.
Figure 5:
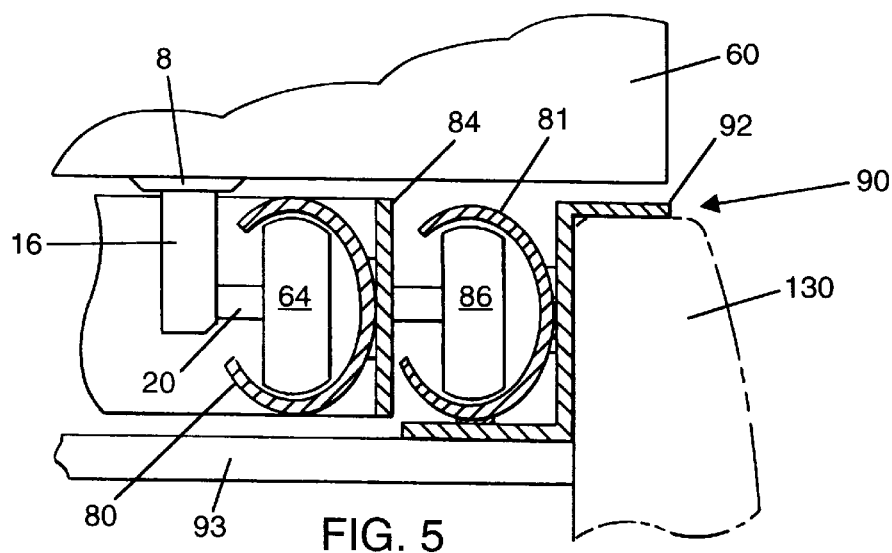
FIG. 5 is an enlarged detail view showing a linear frame base, C-track, and caster assembly attached to a truck bed wall as shown in section 5—5 in FIG. 4 in accordance with a preferred form of the invention.

FIG. 4 sets forth the relationship in a preferred form of the invention of an assembly 60 which includes a means for containing a plurality of tools resting upon the C-frame assembly 90. Also shown are hinged doors 74 and 75 behind which doors tools or other objects may be housed in a toolbox or plurality of drawers, compartments or the like which are well-known to those in the art. In a preferred form of the invention, assembly 60 is equipped with a plurality of wheels (casters) on its underside, as depicted in FIG. 5, and thus it (or its functional equivalent) preferably comprises a first portion of the rotatable mounting means, the other portion of which (the circular track portion or its functional equivalent) is contained in the means for attaching the rotatable mounting means to the bed of the motorized vehicle. It is not critical to the functionality of the invention that the toolbox-bearing portion contains the wheels or casters and that the track portion is contained on the means for attaching the rotatable mounting means to the bed portion of the motorized vehicle, for the wheel portions may be contained by the means for attaching the rotatable mounting means to the bed portion of the motorized vehicle and the track portion may be on the rotatable mounting means, since the net result is the same in each case, which is embraced by the spirit of this invention, that the rotatable mounting means which includes a means for containing a plurality of tools is able to rotate about an axis which is substantially perpendicular to the road surface upon which the motorized vehicle as a whole rests. Preferably though, the underside of the toolbox is equipped with at least four casters when casters are used, mounted equidistantly from one another in a pattern and spacing which matches the opening slots 83 of the round C-track portion 80 shown in FIG. 6, for such an arrangement provides a high degree of ease in affixing the toolbox to the frame portion 84. In an alternate form of the invention, the means for containing a plurality of tools is secured to the top portion of a "lazy Susan" arrangement (which becomes the rotatable mounting means) and the bottom portion of the lazy Susan is secured to the means for attaching the rotatable means by any conventional means, including without limitation the placement of a plurality of casters as described above in this paragraph, or by the bottom portion of the lazy Susan being slid directly into a pair of tracks similar to those 80 and 81.

Figure 7:
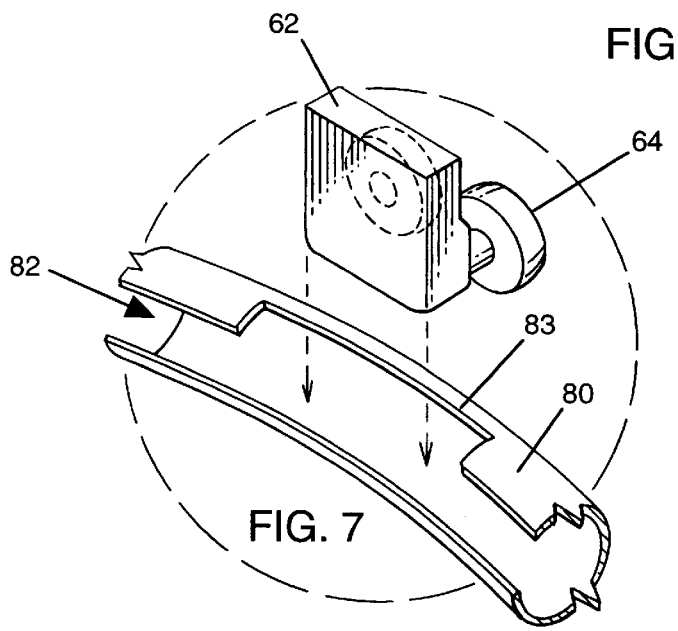
FIG. 7 is an enlarged detail showing a the way the subcomponents of the rotatable mounting means according to a preferred form of the invention are cooperatively connected, including the support wheel slot opening for installation of a means for containing a plurality of tools into the round C-track taken from detail circle 7 in FIG. 6.

FIG. 5 is illustrative of a general principle in accordance with the invention, and depicts the preferred means by which the rotatable mounting means 60 (which includes a means for containing a plurality of tools) is rotatably attached to the frame assembly. Shown affixed to the bottom of the rotatable mounting means 60 by conventional means preferably including a vertical bar 16, horizontal bar 20, and mounting flange 8 is a caster assembly 64 which resides in round C-track portion 80 (as shown in FIG. 7) attached to support frame 84. Such an arrangement permits rotation of the toolbox as a whole upon the support frame 84 about the z-axis shown in FIG. 4, (which z-axis is perpendicular to the surface the truck normally rests upon, i.e., the road surface) and hence within the back of the pickup truck to which the apparatus as a whole is mounted, to permit ease of access by a tradesman irrespective of his position with the bed of the truck. Also attached to support frame 84 is caster assembly 86, which is in turn housed within C-track portion 81 to provide for the sliding of the toolbox 60 in and out of the pickup truck on an as-needed basis. A portion of the truck bed 130 is shown for convenience.

Figure 6:
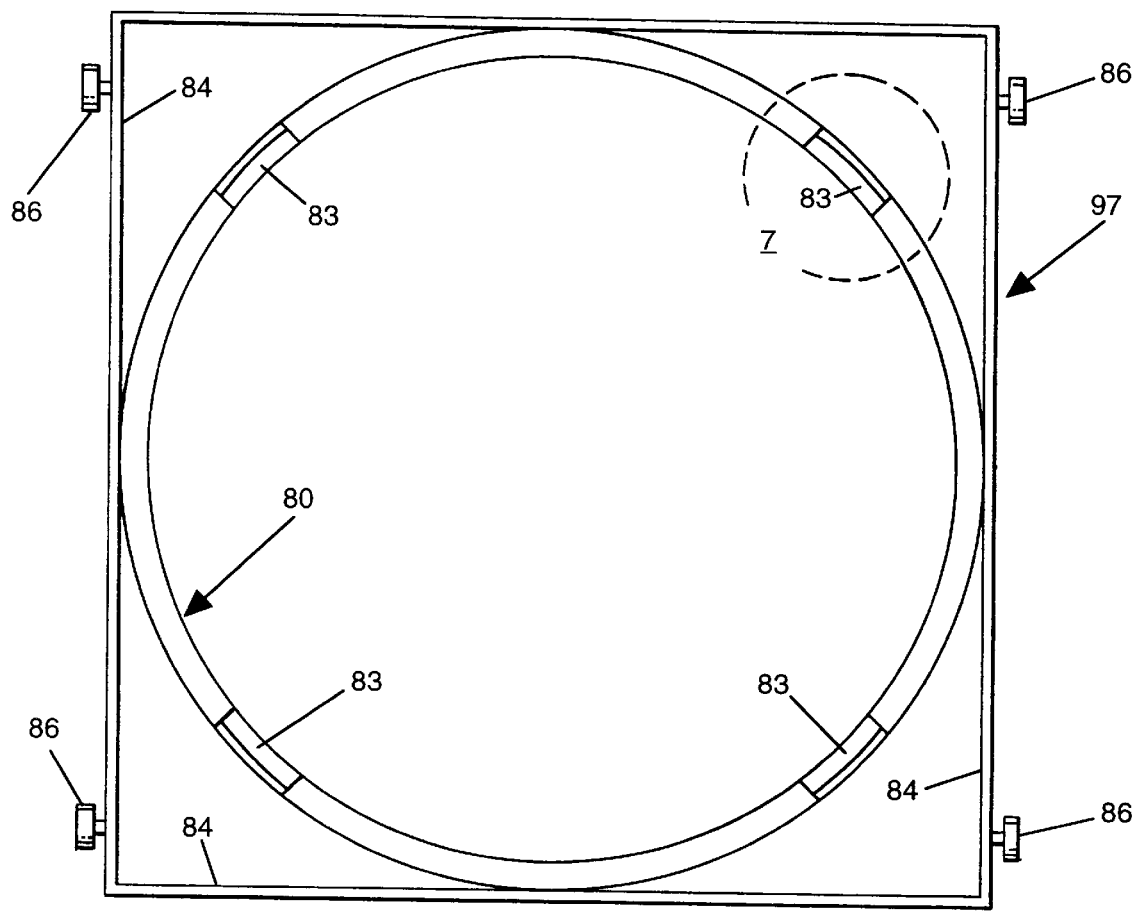
FIG. 6 is a top plan view of the track portion of a rotatable mounting means according to a preferred form of the invention in which the track portion is a round C-track and a frame.

FIG. 6 is a top view of a preferred second portion of a rotatable mounting means showing the relationship between the various elements of the C-track assembly 97 including the support frame 84, casters 86, and round C-track portion 80 having slots 83 therein which allow for insertion of the casters 64 from the toolbox portion therein. The construction of all elements of the invention are preferably metallic to ensure a long service life. However, other structural composites are herein contemplated as being useful in this capacity, provided they are of sufficient structural strength to not buckle or otherwise give in under loads encountered during conditions of normal usage.

FIG. 7 shows the way in which a caster 64 which is attached to the underside of modular portion 62 is inserted into the round C-track portion 80 by means of the slots 83 provided in C-track portion 80.

Figure 8:
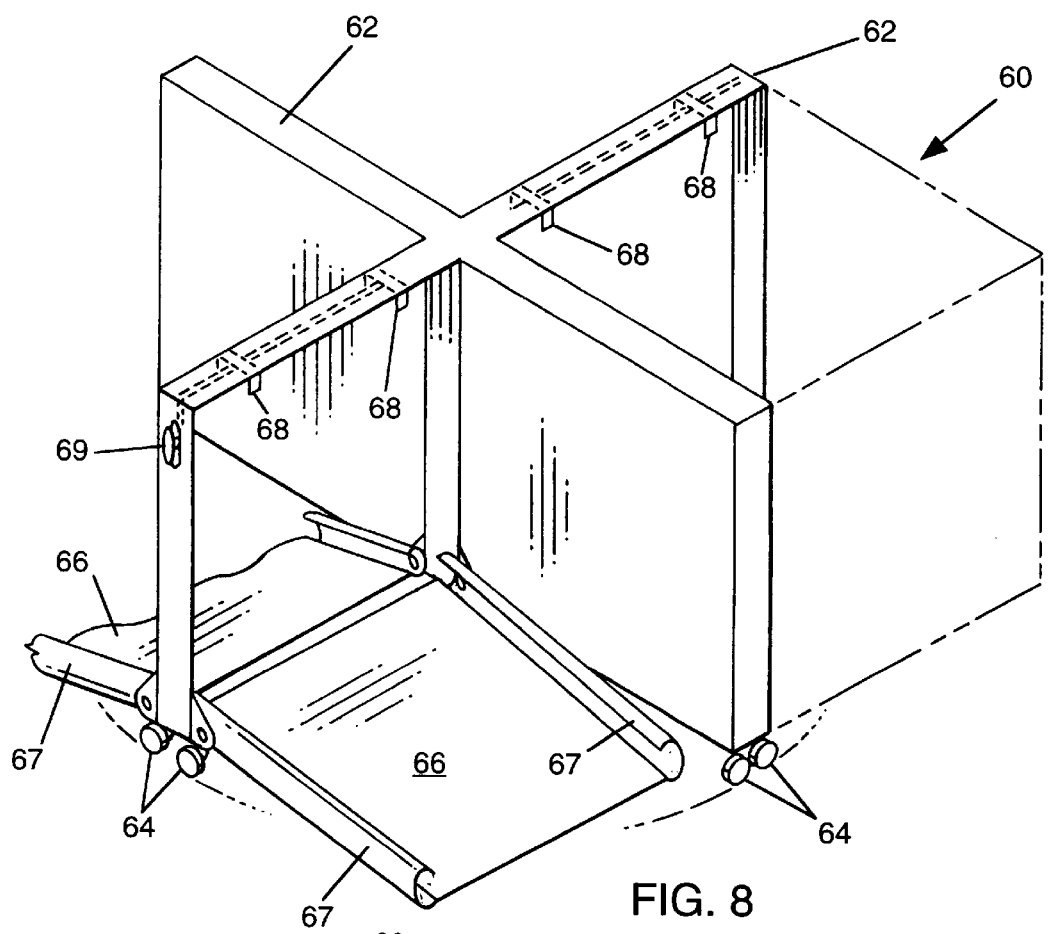
FIG. 8 is a perspective view of a modular portion of the rotatable mounting means which modular portion is also adapted to receive a means for containing a plurality of tools according to a preferred form of the invention, and showing two of the drop-down container ramps of the modular portion.

FIG. 8 depicts a preferred means for containing a plurality of tools according to the invention showing modular frame 62, casters 64, drop-down container ramp 66, C-track 67, closure fastener male portions 68, and release and lock handle 69. Herein, each container assembly 60 is readily removed from the assembly as a whole by a workman either at any location by merely actuating lock handle 69 to release the container assembly 60 thus causing hinged ramp portion 66 to swing slightly downwards, and permitting the container assembly 60 to be slid out from the modular assembly as a whole in a quick and convenient way. While such depicts a preferred first portion of said rotatable mounting means, other functionally equivalent means for permitting rotation of a means for containing a plurality of tools are useful according to the invention, and may include in its simplest form, a square, rectangular, circular or other box affixed to a planar surface which comprises one half of a lazy Susan.

Figure 9:
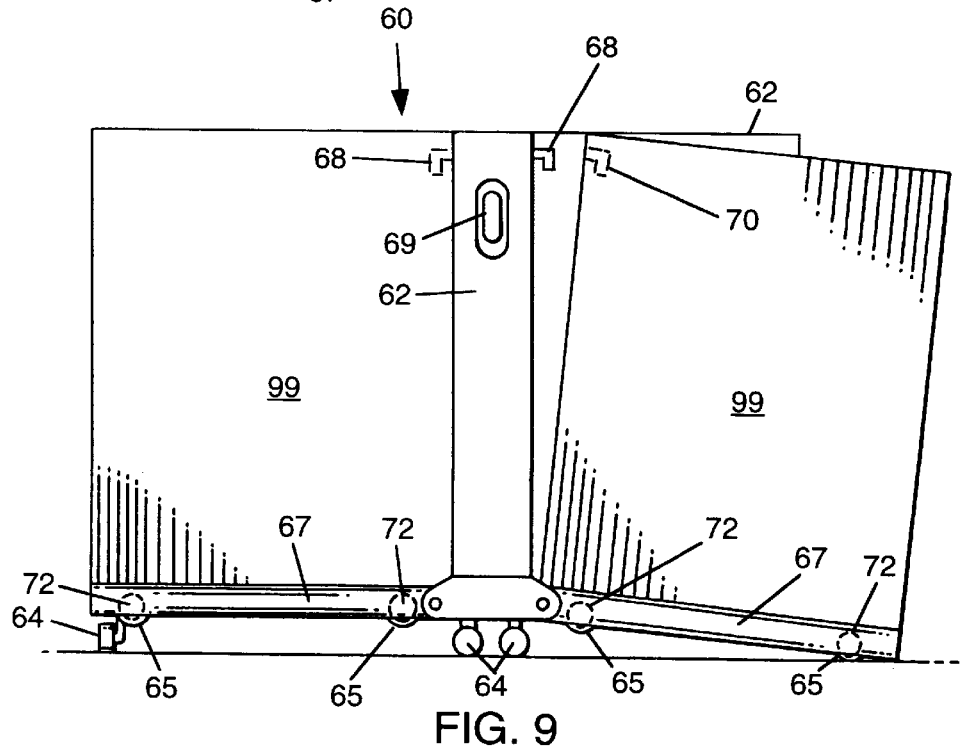
FIG. 9 is a rear view of the modular portion of FIG. 8, showing a means for containing a plurality of tools in a position ready to be either rolled up or rolled off of the modular portion.

FIG. 9 shows a different view of the relationship between the various elements of FIG. 8, in particular showing how casters 72 which are mounted to the container assemblies 60 slidably fit into the C-track 67, as well as the means by which locking in place of the container assembly is accomplished by the sliding closure portions 68 actuated by lock handle 69 fitting into matching grooves in container assembly 60.

Figure 10:
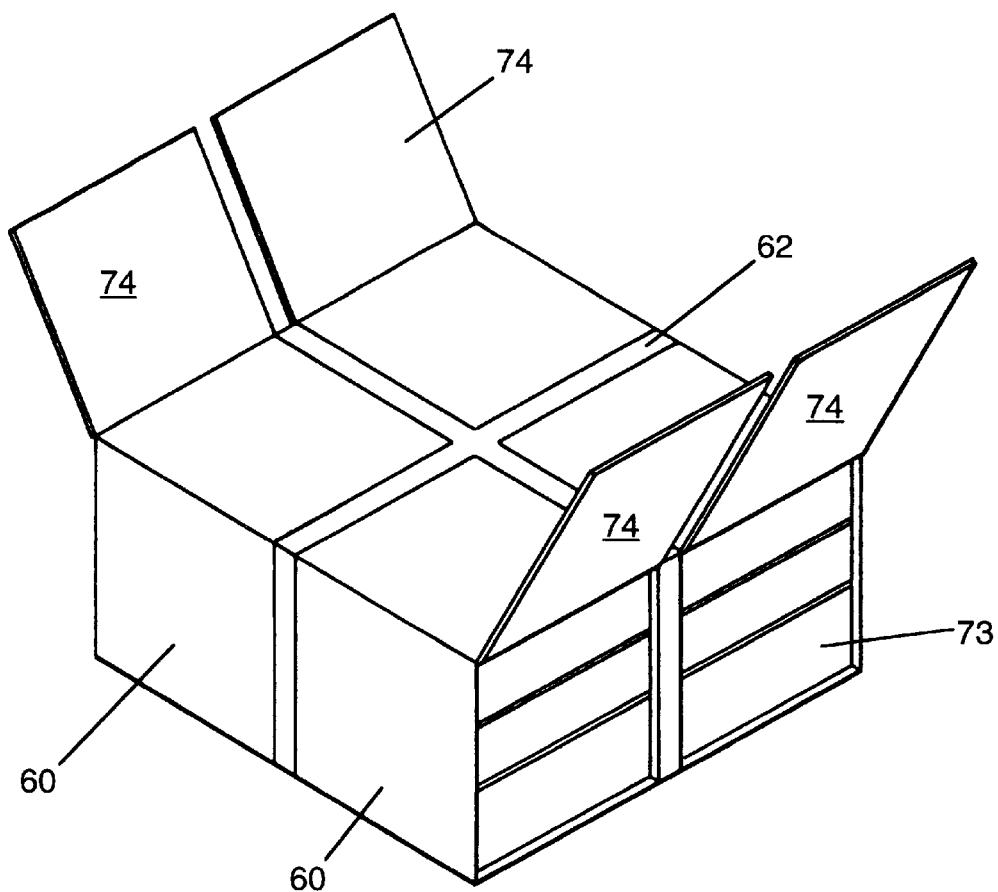
FIG. 10 is a perspective view of a means for containing a plurality of tools according to a preferred form of the invention.

FIG. 10 shows a typical container assembly according to this invention having hinged doors 74 and container drawers 73.

Figure 11:
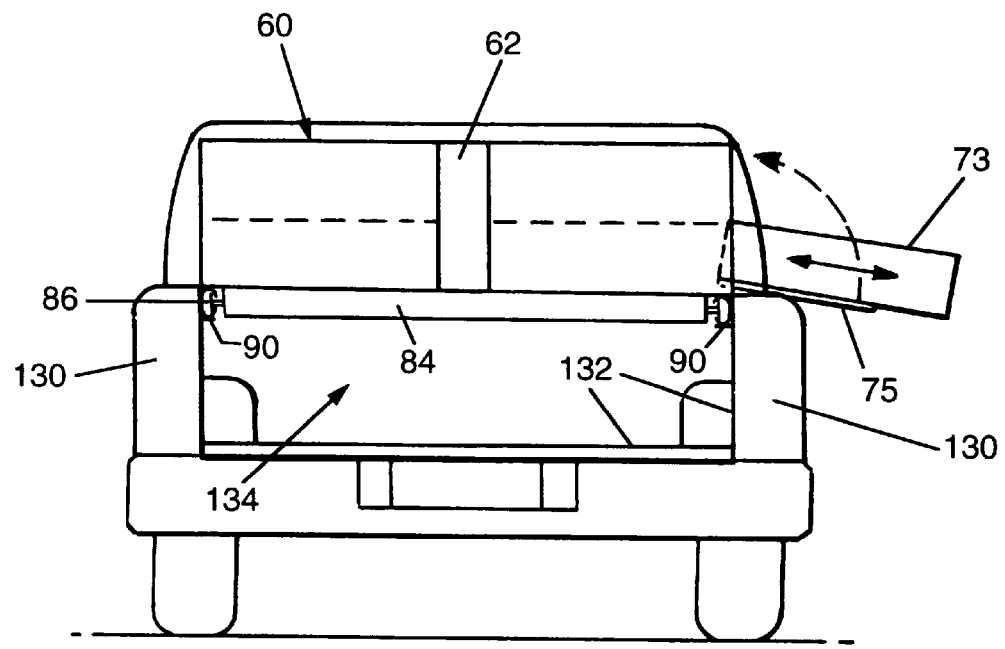
FIG. 11 is a rear view of the preferred embodiment showing a weather door dropped down in a shelf position supporting an opened container drawer as installed in a truck.

FIG. 11 depicts the relationship of a combination according to this invention in a preferred form with respect to the bed of a pickup truck to which it is mounted. Shown here is the modular container assembly 60 slidably mounted within pickup truck bed 130 by means of casters 86 of support frame 84 nested within C-frame 90. Shown herein is container drawer 73 being removed from the toolbox assembly. There is a bottom door 75 which is hinged to swing upwards to be closed in the direction indicated by the arrow. Also shown are the relationship between the open storage area of the pickup truck, the truck bed 132, and truck body portions 130.

Figure 12:
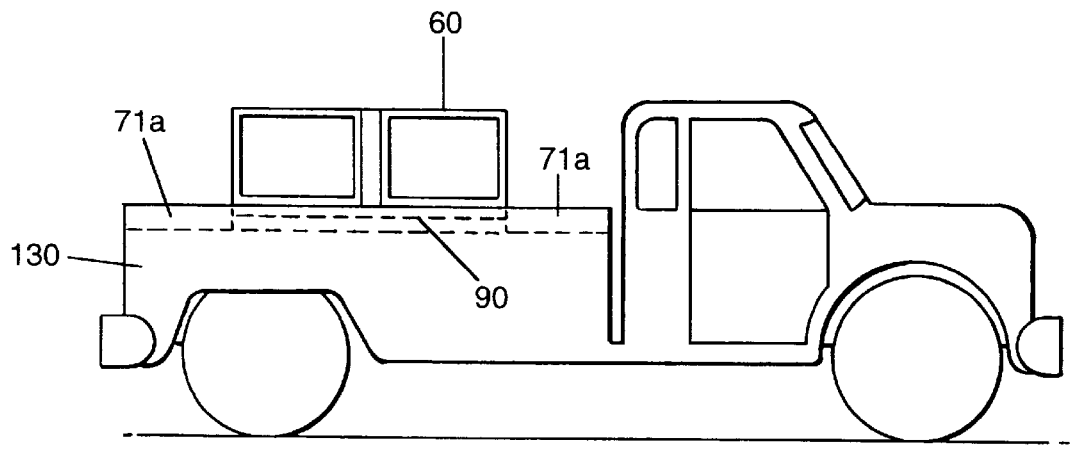
FIG. 12 is a side view of an installation on a truck showing a rotatable mounting means comprising a modular portion which has two means for containing a plurality of tools installed.

FIG. 12 is a side view of a combination according to this invention in a preferred form installed on a pickup truck.

Figure 13:
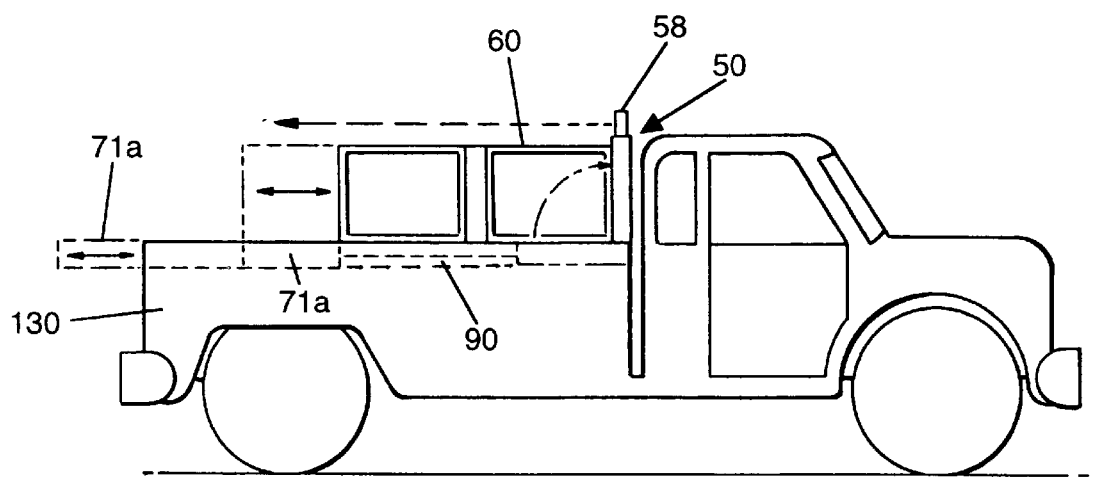
FIG. 13 is a side view of an installation on a truck showing a rotatable mounting means comprising a modular portion which has two means for containing a plurality of tools installed, wherein the rotatable mounting means is in the forward position with the swing-up guard and periscope and two containers installed.

FIG. 13 is a side view of a combination according to this invention in a preferred form installed on a pickup truck showing the periscope in its extended position, thus allowing for rear-view vision capabilities, uninhibited.

Figure 14:
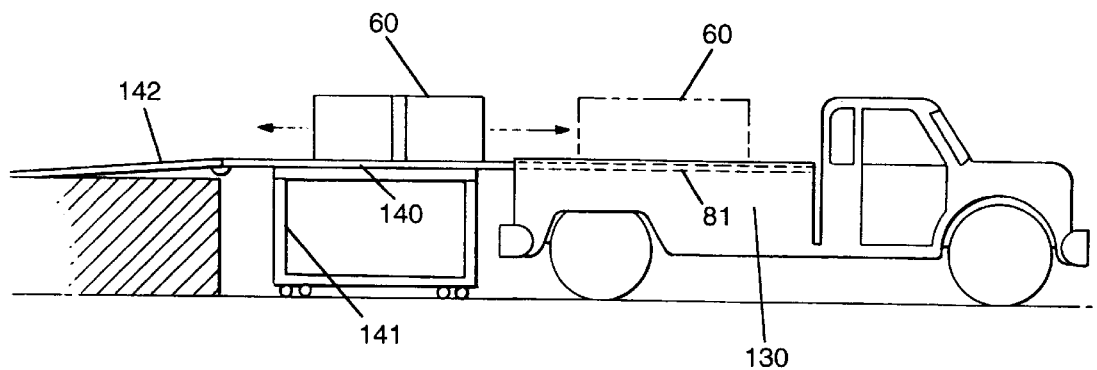
FIG. 14 is a side view showing the loading/unloading of a modular portion of the rotatable mounting means (which contains at least one means for containing a plurality of tools) using a support frame, C-track rails, and C-track ramp.

FIG. 14 shows the means by which a plurality of rotatable mounting means according to the invention may be readily loaded and unloaded from the back of a pickup truck equipped with the instant system. In the figure shown are C-track rails 140 abutted to the C-track portions 81 of the pickup truck, as well as ramp 142 having C-track rails attached to it. Also shown is movable support structure 141.

Figure 15:
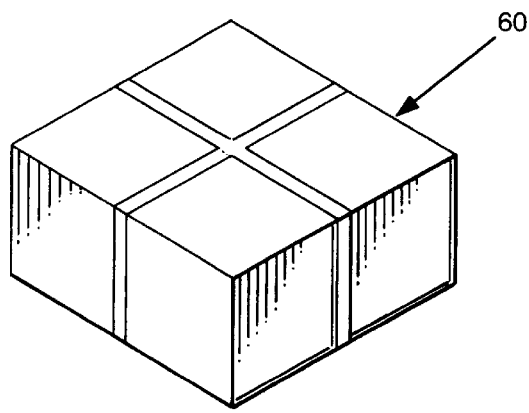
FIG. 15 is a perspective view of a means for containing a plurality of tools off a truck.

FIG. 15 shows a perspective view of a means for containing a plurality of tools, which may in its simplest form be merely a box. Such a box must only be capable of being attached to a first portion of the rotatable mounting means. Since such a box typically has a top portion and a bottom portion, each of which are substantially planar in geometry, this is readily achievable through the use of conventional fasteners including welds, rivets, nuts and bolts, etc.

Figure 16:
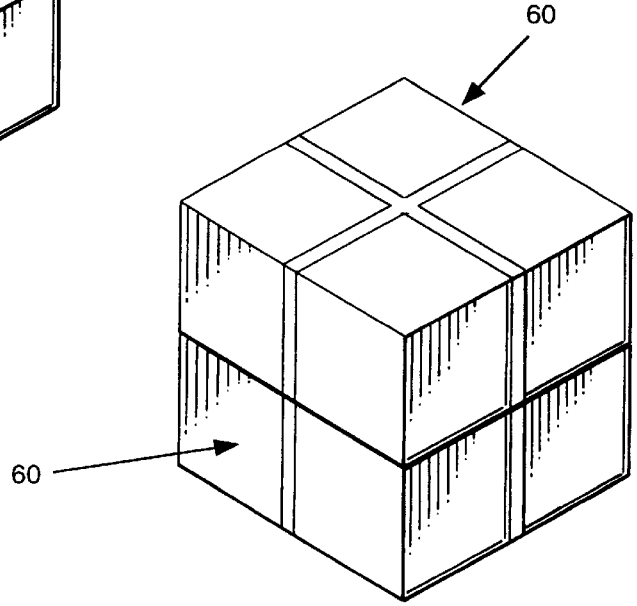
FIG. 16 is a perspective view of two means for containing a plurality of tools stacked off a truck.

FIG. 16 shows a perspective view of two means for containing a plurality of tools which are stacked atop one another in a preferred form of the invention. This is preferred when a storage space is used to contain several toolboxes which may each be selectively loaded onto the device of the invention. Such a stacking ability permits efficiency in use of valuable storage space.

Figure 17:
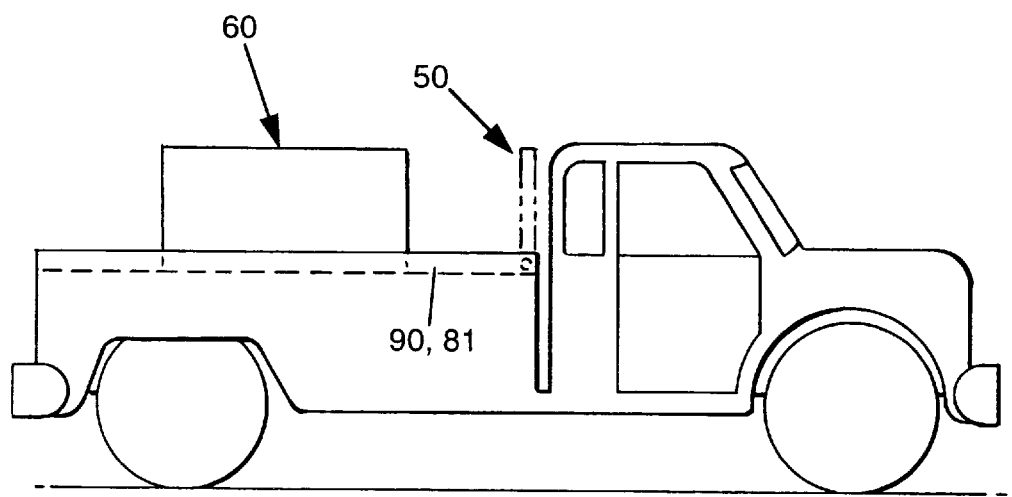
FIG. 17 is a side view of the embodiment in typical traveling position.

FIG. 17 shows a combination according to a preferred form of the invention in normal position under travelling conditions. Here, the means for containing the tools is seen to be centrally loaded within the bed portion of a pickup truck. This is most desirable to permit the maximum rotation of the means for containing the tools and accessibility to the various portion of the means for containing the tools by a workman. In a preferred form of the invention, the means for containing the tools is held in position by stops within the track portions 81.

Figure 18:
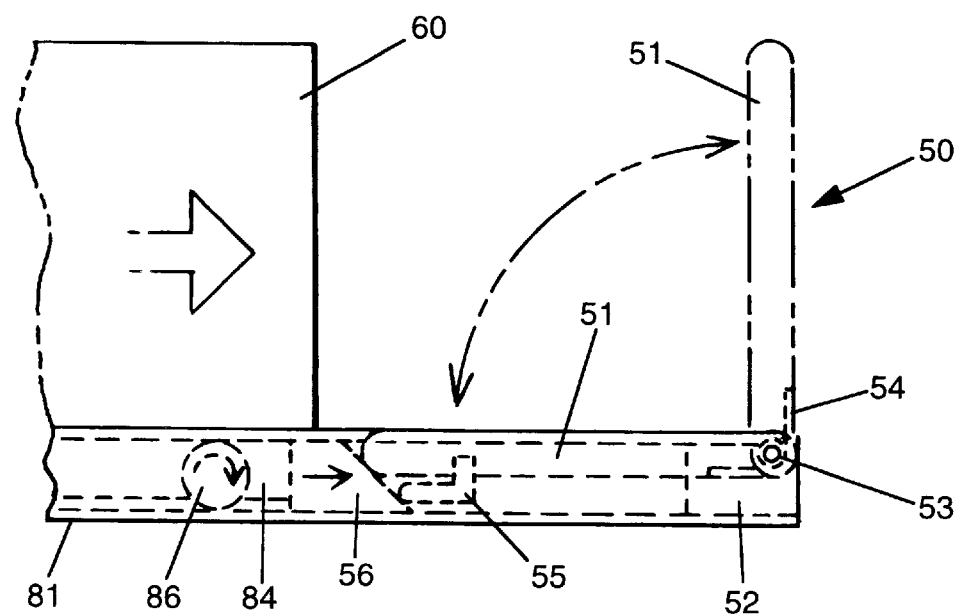
FIG. 18 is a sectional view showing the mechanism of operation of the automatic swing-up cab guard.

FIG. 18 shows a side cutaway view of the mechanism of the safety feature of this invention which is designed to keep the means for containing the tools from striking the driver of the vehicle in the event of a sudden stopping of the vehicle. According to this safety provision, 55 is a release latch which is intended to be actuated by the motion of sliding trigger block 56 upon it, in the event that inertial forces cause caster 86 to contact trigger block 56. The potential energy stored in spring 54 then causes frame portion 51 to swing into an upward position thus protecting cab occupants from physical harm resulting from a stray means for containing tools. Alternatively, the track portions may terminate at a desired point to prevent the possibility of forward motion of the means for containing tools.

Although the invention has been shown and described with respect to certain preferred embodiments, it is obvious that equivalent alterations and modifications will occur to others skilled in the art upon the reading and understand of this specification. The present invention includes all such equivalent alterations and modifications, and is limited only by the scope of the claims appended hereto. For example, the means for containing a plurality of tools, wares, and the like may be any container into which it is possible to contain such objects. This may be a simple box of any geometric configuration, including without limitation rectangular, square, round, hexagonal, etc. The only proviso is that such means for containing a plurality of tools, wares and the like must be capable of being effectively attached to a rotatable mounting means. This may be accomplished by providing the means for containing a plurality of tools, wares, and the like with sufficient hardware to render it rotatable when said hardware is coupled with a complementary counterpart hardware sufficient to enable rotation of the means for containing a plurality of tools, wares, and the like about a z-axis as shown in FIG. 4. Alternatively, the means for containing a plurality of tools, wares, and the like may as a whole be affixed to hardware that itself is already rotatable ("rotatable hardware"), as in the case of a "lazy Susan", radial needle bearing, other aforesaid bearing means, or the functionally equivalent of any of these as such are known to those of ordinary skill in the art. (In any event, the number rotatable mounting means that are readily able to be adapted to receive a means for containing a plurality of tools, wares and the like that are known to those skilled in the art are large, and the instant invention embraces all such means within its spirit.) In such alternative embodiment, the side of the rotatable hardware that is not in mechanical contact with the means for containing a plurality of tools, wares, and the like must be secured to the means for attaching the rotatable mounting means to the bed portion of the motorized vehicle. Such may comprise permanent mechanical connection, such as by welding, or by being held down with nuts and bolts using holes drilled through the side of the rotatable hardware that is not in mechanical contact with the means for containing a plurality of tools, wares, and the like and a connecting member on the vehicle, which may be a frame member or the bed of the truck itself when practicable. In any event, the number of means for attaching the rotatable mounting means to the bed portion of a motorized vehicle that are known to those skilled in the art are large, and the instant invention embraces all such means within its spirit.

We claim:

1. A tool caddying system adaptable for use in conjunction with a motorized vehicle having a bed portion, said system comprising:
   a) a means for containing a plurality of tools;
   b) a rotatable mounting means comprising a first portion and a second portion, wherein said means for containing a plurality of tools is in mechanical contact with said first portion; and
   c) a means for attaching the second portion of said rotatable mounting means to said motorized vehicle, wherein said first and said second portions are disposed about one another to provide rotation of said means for containing a plurality of tools with respect to an axis perpendicular to the plane upon which said vehicle rests, and wherein said second portion of said rotatable mounting means includes a circular track portion.

2. The system according to claim 1 wherein said first portion of said rotatable mounting means is detachable from said second portion of said rotatable mounting means.

3. The system according to claim 1 wherein said second portion of said rotatable mounting means is removable from said means for attaching said second portion of said mounting means to said motorized vehicle.

4. The system according to claim 3 wherein said second portion of said rotatable mounting means is slidably removable from said means for attaching said rotatable mounting means to said motorized vehicle.

5. The system according to claim 1 wherein said first and said second portions of said rotatable mounting means are each substantially planar surfaces arranged in a parallel configuration with respect to one another, and joined by a bearing means.

6. The system according to claim 5 wherein said bearing means comprises a bearing selected from the group consisting of: wide inner ring ball bearings, rod end bearings and associated rods, cylindrical bearings, tapered bearings, spherical bearings, plain bearings, and radial needle roller bearings.

7. The system according to claim 1 wherein said means for attaching the second portion of said rotatable mounting means to said motorized vehicle comprises a rectangular frame assembly defined as comprising two parallel long support rails on its long side and two parallel short support rails on its short side, said long support rails having portions interior and exterior to said rectangular frame assembly.

8. The system according to claim 1 wherein said means for attaching the second portion of said rotatable mounting means to said motorized vehicle includes a plurality of linear track portions having open channel portions along their length and having open ends adapted to receive said second portion of said rotatable mounting means.

9. The system according to claim 1 wherein said means for containing a plurality of tools comprises a toolbox having a plurality of compartments.

10. A tool caddying system adaptable for use in conjunction with a motorized vehicle having a bed portion, said system comprising:

a) a means for containing a plurality of tools;

b) a rotatable mounting means comprising a first portion and a second portion, wherein said means for containing a plurality of tools is in mechanical contact with said first portion; and c) a means for attaching the second portion of said rotatable mounting means to said motorized vehicle, wherein said first and said second portions are disposed about one another to provide rotation of said means for containing a plurality of tools with respect to an axis perpendicular to the plane upon which said vehicle rests, and wherein said second portion of said rotatable mounting means includes a circular track portion having an interior portion and an exterior portion, said circular track portion having a continuous open channel on its interior portion and a plurality of slots for receiving a plurality of rolling means.

11. A tool caddying system adaptable for use in conjunction with a motorized vehicle having a bed portion, said system comprising:

a) a means for containing a plurality of tools;

b) a rotatable mounting means comprising a first portion and a second portion, wherein said means for containing a plurality of tools is in mechanical contact with said first portion; and c) a means for attaching the second portion of said rotatable mounting means to said motorized vehicle, wherein said first and said second portions are disposed about one another to provide rotation of said means for containing a plurality of tools with respect to an axis perpendicular to the plane upon which said vehicle rests, and wherein said means for containing a plurality of tools comprises a modular container assembly comprising an upper and a lower surface wherein said lower surface is substantially flat and wherein a plurality of rolling means disposed on said lower surface of said modular container assembly collectively comprise said first portion of said rotatable mounting means.

12. A tool caddying system adaptable for use in conjunction with a motorized vehicle having a bed portion, said system comprising:

a) a means for containing a plurality of tools;

b) a rotatable mounting means comprising a first portion and a second portion, wherein said means for containing a plurality of tools is in mechanical contact with said first portion; and c) a means for attaching the second portion of said rotatable mounting means to said motorized vehicle, wherein said first and said second portions are disposed about one another to provide rotation of said means for containing a plurality of tools with respect to an axis perpendicular to the plane upon which said vehicle rests, wherein said means for containing a plurality of tools comprises a modular container assembly comprising an upper and a lower surface wherein said lower surface is substantially flat and wherein a plurality of rolling means disposed on said lower surface of said modular container assembly collectively comprise said first portion of said rotatable mounting means, and wherein said rolling means comprises a caster.

13. A tool caddying system adaptable for use in conjunction with a motorized vehicle having a bed portion, said system comprising:

a) a means for containing a plurality of tools;

b) a rotatable mounting means comprising a first portion and a second portion, wherein said means for containing a plurality of tools is in mechanical contact with said first portion; and c) a means for attaching the second portion of said rotatable mounting means to said motorized vehicle, wherein said first and said second portions are disposed about one another to provide rotation of said means for containing a plurality of tools with respect to an axis perpendicular to the plane upon which said vehicle rests wherein said means for containing a plurality of tools comprises a modular container assembly comprising an upper and a lower surface wherein said lower surface is substantially flat and wherein a plurality of rolling means disposed on said lower surface of said modular container assembly collectively comprise said first portion of said rotatable mounting means, and wherein said modular assembly includes at least one hinged ramp.

14. A tool caddying system adaptable for use in conjunction with a motorized vehicle having a bed portion, said system comprising:

a) a means for containing a plurality of tools;

b) a rotatable mounting means comprising a first portion and a second portion, wherein said means for containing a plurality of tools is in mechanical contact with said first portion; and c) a means for attaching the second portion of said rotatable mounting means to said motorized vehicle, wherein said first and said second portions are disposed about one another to provide rotation of said means for containing a plurality of tools with respect to an axis perpendicular to the plane upon which said vehicle rests, wherein said means for containing a plurality of tools comprises a modular container assembly comprising an upper and a lower surface wherein said lower surface is substantially flat and wherein a plurality of rolling means disposed on said lower surface of said modular container assembly collectively comprise said first portion of said rotatable mounting means, and wherein the modular container assembly comprises a frame which includes at least one container module removably attached thereto.

15. A tool caddying system adaptable for use in conjunction with a motorized vehicle having a bed portion, said system comprising:

a) a means for containing a plurality of tools;

b) a rotatable mounting means comprising a first portion and a second portion, wherein said means for containing a plurality of tools is in mechanical contact with said first portion; and c) a means for attaching the second portion of said rotatable mounting means to said motorized vehicle, wherein said first and said second portions are disposed about one another to provide rotation of said means for containing a plurality of tools with respect to an axis perpendicular to the plane upon which said vehicle rests, wherein said means for containing a plurality of tools comprises a modular container assembly comprising an upper and a lower surface wherein said lower surface is substantially flat and wherein a plurality of rolling means disposed on said lower surface of said modular container assembly collectively comprise said first portion of said rotatable mounting means, wherein the modular container assembly comprises a frame which includes at least one container module removably attached thereto, and wherein the container module includes a locking means for securing the container module to the frame of the modular container assembly.

16. A tool caddying system adaptable for use in conjunction with a motorized vehicle, said system comprising:

a) a frame assembly defined as comprising a plurality of parallel support rails;
b) a rotatable mounting means comprising a first portion and a second portion;
c) a plurality of linear track portions having ends adapted to receive at least one second portion of a rotatable mounting means, said linear track portions affixed to said parallel support rails; and
d) a modular container assembly comprising a substantially flat lower surface, wherein said first portion of said rotatable mounting means is in mechanical contact with said modular container assembly, wherein said second portion of said rotatable mounting means is in slidable contact with at least one of said track portions, and wherein said second portion of said rotatable mounting means includes a circular track portion having an interior portion and an exterior portion, said circular track portion having a continuous open channel on its interior portion.

17. The system of claim 16 wherein said frame assembly is adapted to be affixed to a motorized vehicle.

18. The system of claim 16 wherein said frame assembly is substantially rectangular and comprises two parallel long support rails on its long side, and two parallel short support rails on its short side, said long support rails having portions interior and exterior to said rectangular frame assembly.

19. A tool caddying system adaptable for use in conjunction with a motorized vehicle, said system comprising:

e) a frame assembly defined as comprising a plurality of parallel support rails;
f) a rotatable mounting means comprising a first portion and a second portion;
g) a plurality of linear track portions having ends adapted to receive at least one second portion of a rotatable mounting means, said linear track portions affixed to said parallel support rails; and
h) a modular container assembly comprising a substantially flat lower surface, wherein said first portion of said rotatable mounting means is in mechanical contact with said modular container assembly, wherein said second portion of said rotatable mounting means is in slidable contact with at least one of said track portions, and wherein said modular container assembly comprises a lower surface wherein said lower surface is substantially flat and has a first portion of a rotatable assembly that comprises a plurality of rolling means attached thereto, in such orientation to permit cooperative connection of the rolling means with a complementary second portion of said rotatable mounting assembly, in order to confer rotational capability of said modular container assembly with respect to said frame assembly when said rotatable mounting assembly is attached to said frame assembly.

20. A tool caddying system adaptable for use in conjunction with a motorized vehicle having a bed portion, said system comprising:

a) a frame assembly defined as comprising two parallel first support rails along its first dimension, and two parallel second support rails on its second side, said first support rails having portions interior and exterior to said frame assembly;
b) a rotational mount assembly that comprises a first portion and a second portion and which comprises as said second portion a circular track portion having an interior portion and an exterior portion, said circular track portion having an open channel on its interior portion and a means for receiving a first portion of said rotational mount assembly that comprises a plurality of rolling means, said circular track portion attached to an outer framework having inner and outer surfaces wherein said outer framework includes a plurality of rolling elements disposed on its outer surfaces;
c) at least one linear track portion having an open channel portion along its length and having an open end adapted to receive a rotational mount assembly, said at least one linear track portion affixed to the interior portion of at least one of said first parallel support rails; and
d) a modular container assembly comprising an upper and a lower surface wherein said lower surface is flat and has a plurality of rolling means attached thereto in such orientation to permit insertion of said rolling means into cooperative connection with said circular track portion in order to confer rotational capability of said modular container assembly with respect to said rectangular frame assembly.

* * * * *